US011856029B2

(12) United States Patent
Bastos et al.

(10) Patent No.: US 11,856,029 B2
(45) Date of Patent: Dec. 26, 2023

(54) COMPUTER-IMPLEMENTED SECURITY METHODS AND SYSTEMS

(71) Applicant: BRITISH TELECOMMUNICATIONS, public limited company, London (GB)

(72) Inventors: Daniel Bastos, London (GB); Fadi Ali El-Moussa, London (GB); Behnam Azvine, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 396 days.

(21) Appl. No.: 17/346,987

(22) Filed: Jun. 14, 2021

(65) Prior Publication Data
US 2022/0021709 A1    Jan. 20, 2022

(30) Foreign Application Priority Data

Jul. 17, 2020  (GB) ..................... 2011025

(51) Int. Cl.
*H04L 9/40* (2022.01)
*G06F 16/23* (2019.01)
*G06N 20/00* (2019.01)

(52) U.S. Cl.
CPC .......... *H04L 63/20* (2013.01); *G06F 16/2379* (2019.01); *G06N 20/00* (2019.01); *H04L 63/10* (2013.01)

(58) Field of Classification Search
CPC ..... H04L 63/20; H04L 63/10; H04L 63/1408; H04L 63/1433; H04L 63/14;

(Continued)

(56) References Cited

U.S. PATENT DOCUMENTS 9,426,185 B1 *  8/2016  Vora .................... H04L 63/0492
9,734,341 B1     8/2017  Cheng
(Continued)

FOREIGN PATENT DOCUMENTS

WO   2019/030748   2/2019
WO   2019/122832   6/2019

OTHER PUBLICATIONS

Baptista et al., "A Novel Malware Detection System Based on Machine Learning and Binary Visualization", 2019 IEEE International Conference on Communications Workshops (ICC Workshops), 2019, 6 total pages.

(Continued)

*Primary Examiner* — Michael R Vaughan
(74) *Attorney, Agent, or Firm* — Nixon & Vanderhye P.C.

(57) ABSTRACT

The present disclosure relates to securing networks against attacks launched via connection of peripheral devices to networked devices. According to one aspect, there is provided a computer-implemented method of automatically updating a network security policy, the method comprising: running a machine learning algorithm to continuously update a plurality of weighting coefficients associated with a respective plurality of threat factors, the threat factors each having values defined for each of a plurality of requests for respective peripheral devices to connect to one or more networked devices which are communicably coupled to a secure network; and automatically updating a security policy associated with the secure network in respect of a particular threat factor when that threat factor's associated weighting coefficient changes by more than a predetermined amount in a predetermined period, wherein requests for peripheral devices to connect to the networked devices are automatically approved or denied in dependence on that policy.

10 Claims, 6 Drawing Sheets

(58) Field of Classification Search
CPC .. G06F 16/2379; G06F 21/604; G06F 21/577; G06F 21/82; G06F 21/55; G06N 20/00
See application file for complete search history.

(56) References Cited

U.S. PATENT DOCUMENTS

| | | | | |
|---|---|---|---|---|
| 10,382,461 | B1* | 8/2019 | Sharifi Mehr | H04L 63/1425 |
| 10,594,710 | B2* | 3/2020 | Wright | G06F 21/552 |
| 10,599,844 | B2* | 3/2020 | Schmidtler | G06F 21/562 |
| 10,855,715 | B2* | 12/2020 | Martin | H04L 63/1433 |
| 2007/0199060 | A1 | 8/2007 | Touboul | |
| 2013/0191919 | A1* | 7/2013 | Basavapatna | H04L 63/20 726/25 |
| 2015/0215334 | A1 | 7/2015 | Bingham et al. | |
| 2015/0229662 | A1* | 8/2015 | Hitt | H04L 63/1425 726/23 |
| 2016/0173509 | A1* | 6/2016 | Ray | H04L 63/1425 726/23 |
| 2016/0182539 | A1 | 6/2016 | Edwards et al. | |
| 2017/0206351 | A1 | 7/2017 | Jay et al. | |
| 2017/0208082 | A1 | 7/2017 | Jalan et al. | |
| 2017/0251013 | A1 | 8/2017 | Kirti et al. | |
| 2018/0139227 | A1* | 5/2018 | Martin | H04L 63/1433 |
| 2018/0191766 | A1* | 7/2018 | Holeman | H04L 63/1425 |
| 2019/0021004 | A1 | 1/2019 | Shanmugavadivel et al. | |
| 2019/0068627 | A1* | 2/2019 | Thampy | H04L 63/1425 |
| 2019/0116193 | A1* | 4/2019 | Wang | G06N 20/00 |
| 2019/0319971 | A1* | 10/2019 | Levy | G06F 16/137 |
| 2019/0319987 | A1* | 10/2019 | Levy | H04L 63/0838 |
| 2020/0074078 | A1 | 3/2020 | Saxe et al. | |
| 2022/0012352 | A1* | 1/2022 | Boding | G06F 21/604 |

OTHER PUBLICATIONS

Crowdstrike, "Falcon Endpoint Protection Premium", Falcon Premium Bundle Data Sheet, 2019, 2 total pages.
Honeywell, "Honeywell Industrial USB Threat Report: Universal Serial Bus (USB) Threat Vector Trends and Implications for Industrial Operators", 2018, 12 total pages.
Nohl, K., & Lell, J., "BadUSB-On accessories that turn evil." Black Hat USA, 2014, vol. 1, No. 9, 29 total pages.
GB Search Report for GB2011025.0 dated May 4, 2021, 5 total pages.
Souppaya, M., & Scarfone, K. "Guide to malware incident prevention and handling for desktops and laptops", NIST Special Publication 800-83, Revision 1, 2013, 47 total pages.
Examination Report and Notification of Intention to Grant under Section 18(4) dated May 19, 2022 issued for GB2011025.0 (2 pages).
Extended European Search Report dated Nov. 9, 2021 issued for European Application No. 21178808.8 (5 pages).

* cited by examiner

COMPUTER-IMPLEMENTED SECURITY METHODS AND SYSTEMS

CROSS-REFERENCE TO RELATED APPLICATIONS

This application claims priority to GB 2011025.0 filed Jul. 17, 2020, the entire content of which is hereby incorporated by reference.

FIELD

The present disclosure relates to securing networks against attacks launched via connection of peripheral devices to networked devices.

More specifically, aspects relate to computer-implemented methods of automatically updating network security policies, data processing systems configured to perform such methods, computer programs comprising instructions which, when the program is executed by a computer, cause the computer to carry out such methods, computer-readable data carriers having such computer programs stored thereon and data carrier signals carrying such computer programs.

BACKGROUND

Peripheral devices can provide many different kinds of functionality to supplement that of networked devices such as personal computers (PCs) and laptops. For example, peripheral devices can provide additional and portable storage (e.g. in the form of flash drives and external hard drives), user interfaces (e.g. in the form of mice, keyboards and audio headsets), communication functionality (e.g. in the form of network adapters) or functionality unrelated to that of the networked device but which makes use of its power supply (e.g. desk fans or mobile device chargers).

Connecting a peripheral device to a networked device, e.g. via a universal serial bus (USB) port, can however result in attacks on the networked device and/or a network it is connected to. The individual connecting the peripheral device may intend this or may unwittingly enable it, e.g. by using a "freebie" thumb drive to transfer files between their work and personal computers.

Peripheral devices can be turned to malicious purposes in various ways. A peripheral device's internal microcontroller can be reprogrammed so that it appears to be of one type (e.g. a charger) but carries out the functions of another type (e.g. injecting keystrokes like a keyboard). A peripheral device's firmware can be reprogrammed to allow execution of malicious actions such as malware downloading or data exfiltration. Peripheral devices can also be used to launch electrical attacks on devices they are connected to (e.g. through USB power surge).

Malicious actions facilitated by peripheral device connection to a networked device can for example include:
- remote control of the networked device;
- spying through collection of data from network interfaces or user interfaces such as webcams, microphones and keyboards;
- theft of confidential or sensitive data such as passwords, confidential business information or personal information;
- encryption of data as leverage to demand a ransom;
- deletion, modification or injection of data or code; and
- hardware damage or destruction.

Antivirus software run on networked devices often includes functionality for scanning peripheral devices on physical connection for the presence of known malware and denying connection requests when known malware is found. However such software does not protect against novel malware.

To reduce the risk of peripheral device attacks taking place, network administrators for organisations can implement tools for enforcing peripheral device connection policies. For example such policies can mandate automatic approval of types of connection requests which staff are regularly required to make to perform their duties but mandate automatic denial of connection requests which are atypical for that organisation. However such policies can result in denial of legitimate connection requests.

What is needed is a more flexible approach which can provide security against novel peripheral device attacks without unnecessarily limiting peripheral device usage.

SUMMARY

According to a first aspect, there is provided a computer-implemented method of automatically updating a network security policy, the method comprising:
- running a machine learning algorithm to continuously update a plurality of weighting coefficients associated with a respective plurality of threat factors, the threat factors each having values defined for each of a plurality of requests for respective peripheral devices to connect to one or more networked devices which are communicably coupled to a secure network; and
- automatically updating a security policy associated with the secure network in respect of a particular threat factor when that threat factor's associated weighting coefficient changes by more than a predetermined amount in a predetermined period, wherein requests for peripheral devices to connect to the networked devices are automatically approved or denied in dependence on that policy.

According to a second aspect, there is provided a computer-implemented security method comprising:
- A-i) obtaining a peripheral connection request profile detailing a request for a peripheral device to connect to a networked device which is one of a plurality of networked devices communicably coupled to a secure network;
- A-ii) in response to obtaining the peripheral connection request profile, obtaining a threat score associated with the request, the threat score being determined from a weighted combination of a plurality of threat factors, each threat factor:
  - having a value dependent on contents of a respective field of the profile, and
  - having a respective associated weighting coefficient;
- A-iii) in response to obtaining the threat score:
  - a) when the threat score is above a predetermined threshold, providing a denial of the request;
  - b) otherwise:
    - b-i) obtaining a policy decision based on a comparison of the profile with a policy associated with the secure network, then
    - b-ii) providing an approval or denial of the request in accordance with the policy decision;
- A-iv) in response to providing an approval or denial of the request, causing the profile to be stored in a database in association with an indication of whether an approval or denial of the request was provided; and A-v) in response to causing the profile to be stored in the database, updating the weighting coefficients in dependence on contents of the database;
the method further comprising:
B-i) monitoring updates to the weighting coefficients; and
B-ii) causing the policy to be automatically updated in respect of a particular threat factor in response to that threat factor's associated weighting coefficient changing by more than a predetermined amount in a predetermined period.

Each threat factor can be respectively associated with one or more of:
hardware characteristics of the peripheral device the respective request is for connection of;
software characteristics of that peripheral device;
storage characteristics of that peripheral device;
characteristics of the networked device the respective request is for connection to; and
characteristics of the request.

Updating the policy can comprise one or more of:
adding one or more new rules to the policy;
adjusting one or more existing rules comprised in the policy; and
deleting one or more existing rules from the policy.

The policy can comprise one or more rules relating to one or more of:
categories of peripheral devices permitted to be connected to networked devices of the secure network;
software permitted to be installed on networked devices of the secure network;
applications permitted to be run on networked devices of the secure network;
services permitted to be accessed via the secure network;
websites permitted to be accessed via the secure network;
folders and/or files permitted to be accessed via the secure network; file types permitted to be opened on networked devices of the secure network;
time periods when peripheral devices can be connected to networked devices of the secure network; and
administrator and/or user account logins under which one or more of the above are permitted to be performed.

According to a third aspect, there is provided a data processing system configured to perform the method of either the first or second aspects.

According to a fourth aspect, there is provided a computer program comprising instructions which, when the program is executed by a computer, cause the computer to carry out the method of either of the first or second aspects.

According to a fifth aspect, there is provided a computer-readable data carrier having stored thereon the computer program of the fourth aspect.

According to a sixth aspect, there is provided a data carrier signal carrying the computer program of the fourth aspect.

BRIEF DESCRIPTION OF THE FIGURES

Aspects of the present disclosure will now be described by way of example with reference to the accompanying figures. In the figures.

DETAILED DESCRIPTION OF THE FIGURES

The following description is presented to enable any person skilled in the art to make and use the system, and is provided in the context of a particular application. Various modifications to the disclosed embodiments will be readily apparent to those skilled in the art.

Methods are proposed herein in which peripheral device connection requests are automatically permitted or denied according to a network security policy. The decision as to whether to permit or deny each request is made in dependence on weighted threat factors, for example associated with one or more of:
characteristics of the peripheral device such as hardware characteristics (e.g. manufacturer), software characteristics (e.g. presence of autorun files) or storage characteristics (e.g. file system type);
characteristics of the networked device the respective request is for connection to (e.g. primary user or operating system); and
characteristics of the request itself (e.g. time of day).

The weighting coefficients for the threat factors are updated over time, for example according to a machine learning algorithm. The policy is then updated in response to dramatic changes in the weighting coefficients. In this way, the security policy is continuously updated in a manner tailored to the network's context (e.g. an enterprise or other organisation), so that attacks targeted at the network can be thwarted without legitimate user activities being unnecessarily restricted.

For example, the policy may initially permit USB drives to connect to the Internet, provided anti-virus software does not detect malware. However, if such a behaviour is found to lead to transmission of confidential data to a web server on multiple occasions in a short space of time then the weighting of the threat factor associated with Internet connection by a peripheral device will increase dramatically, triggering a policy update to reject USB connection requests involving Internet access in future.

Figure 1:
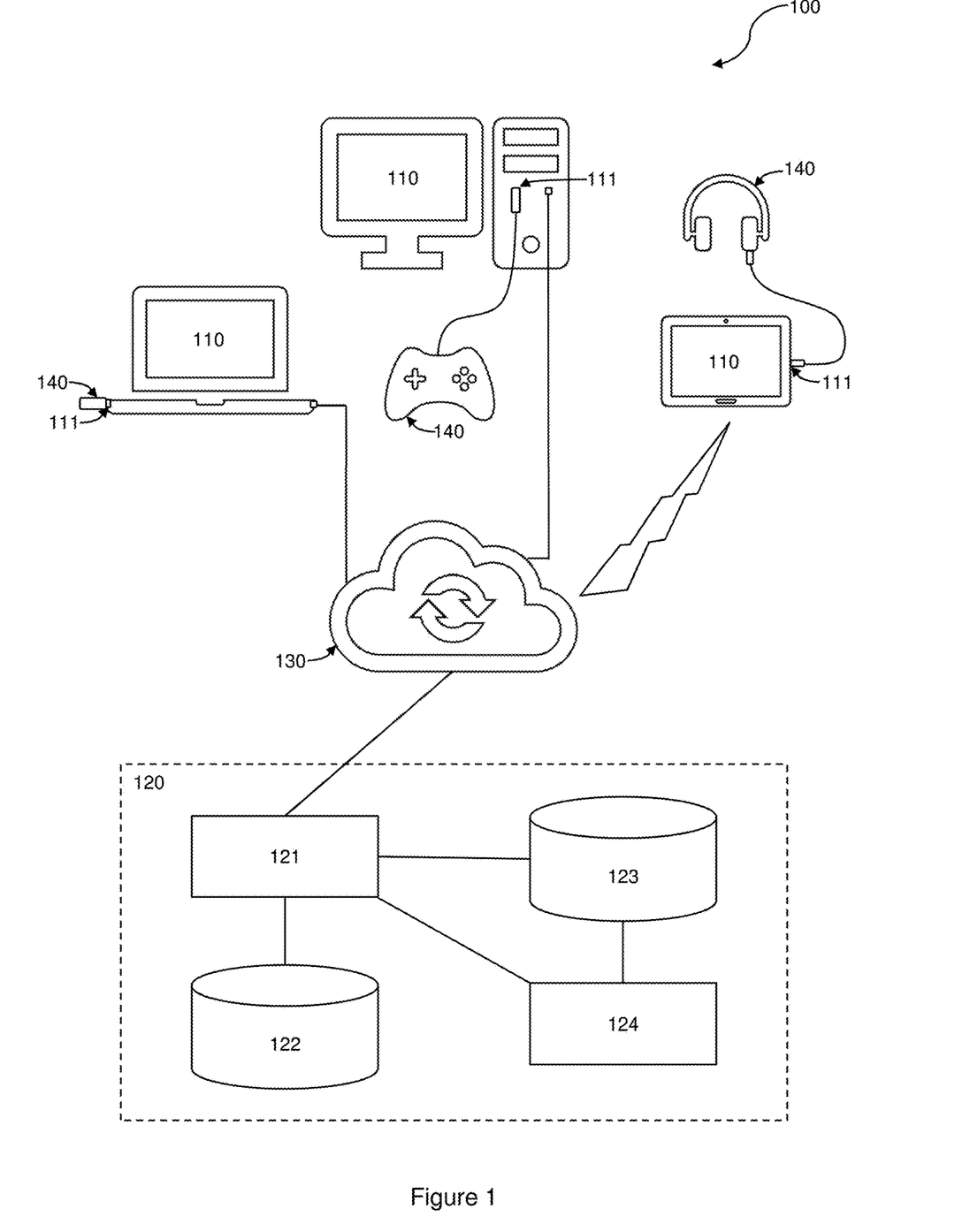
FIG. 1 schematically illustrates an example system in which the proposed methods can be implemented.

FIG. 1 schematically illustrates an example system 100 in which the proposed methods can be implemented. A plurality of user devices 110 and an enforcement engine 121 are all communicably coupled to a network 130. The user devices 110 could for example be laptop computers, desktop computers or tablets as shown.

Each of the user devices 110 comprises at least one physical peripheral device interface 111, for example a USB port, to which peripheral devices 140 can be physically connected. The peripheral devices 140 could for example be flash drives, games controllers or audio headsets as shown.

The enforcement engine 121 is communicably coupled to a profile store 122, a policy store 123 and a policy update engine 124. These four components could for example all reside in a server 120. Alternatively they could each reside in one of a plurality of separate computing devices or be distributed between a plurality of separate computing devices.

Figure 2A:
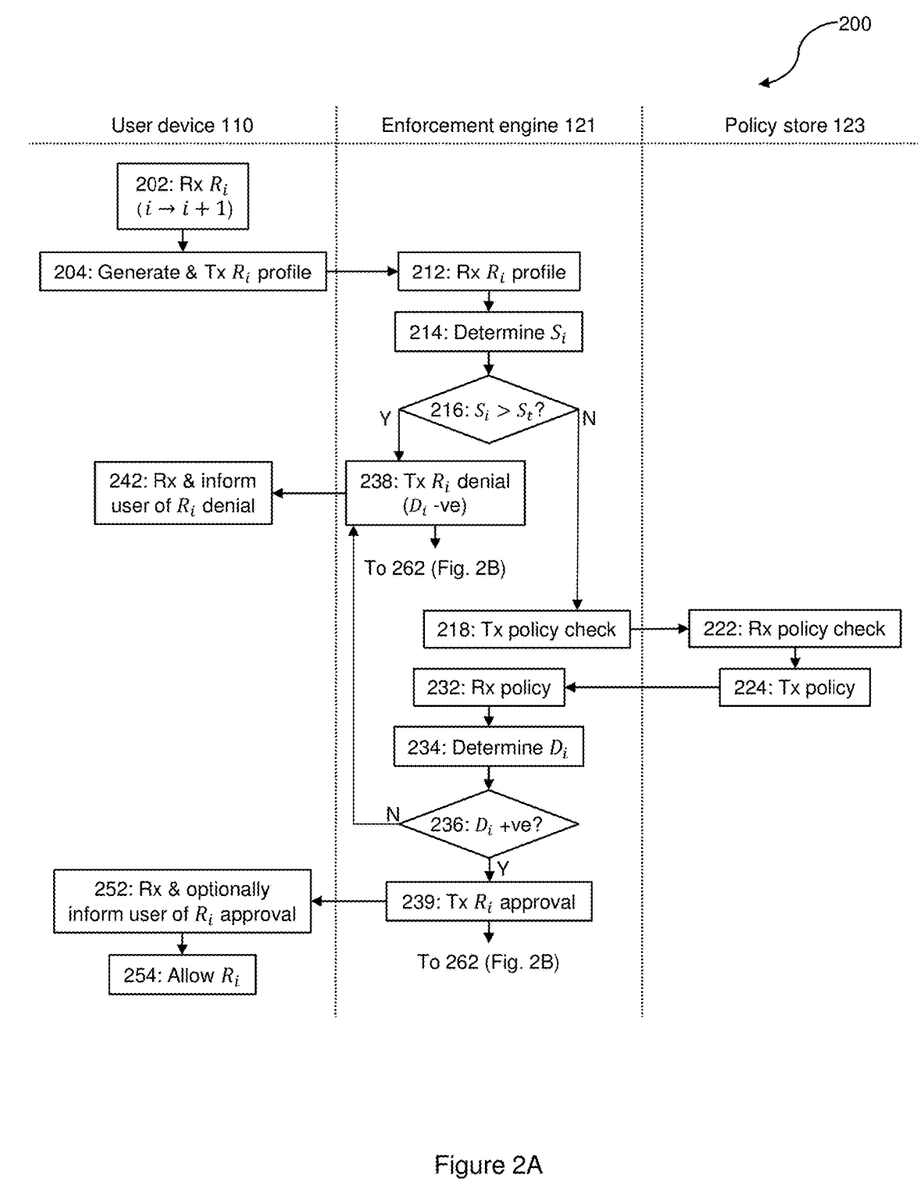
FIGS. 2A and 2B show an example process illustrating example interactions between the components of the system of FIG. 1.
Figure 2B:
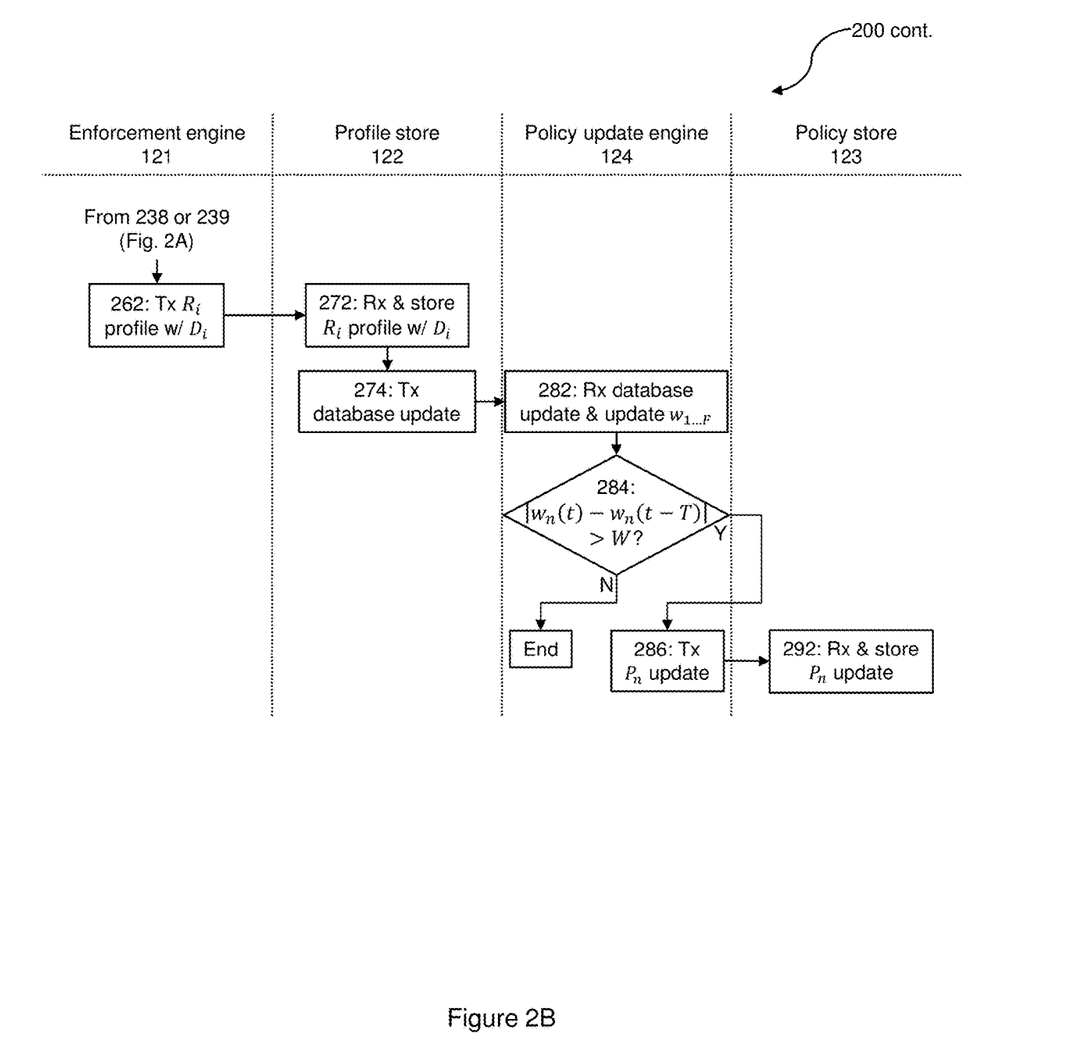

FIGS. 2A and 2B show an example process 200 illustrating example interactions between the components of the system 100 of FIG. 1.

The process 200 begins at step 202, where a user device 110 receives (Rx) a connection request $R_i$ from a peripheral device 140. At step 204 the user device 110 then generates a profile of the request $R_i$ having fields indicating the values $f_n$ of a plurality F of threat factors and transmits (Tx) the request $R_i$ profile to the enforcement engine 121.

The enforcement engine 121 receives the request $R_i$ profile at step 212 then determines a threat score $S_i$ associated with the request $R_i$ at step 214. The threat score $S_i$ is determined from a weighted combination of the plurality F of threat factor values $f_n$. Each threat factor has a value $f_n$ dependent on contents of a respective field of the request $R_i$ profile and has a respective associated weighting coefficient $w_n$. The threat score $S_i$ could for example be defined as $S_i = \sum_{n=1}^{F} w_n f_n$, or as some other weighted combination of the threat factor values $f_n$. The initial threat factor and weighting coefficient values could for example be as follows.

| Threat factor number n | Threat factor value $f_n$ | Weighting coefficient $w_n$ |
|---|---|---|
| 1 | 1 when malware detected on peripheral device, 0 otherwise | 1 |
| 2 | 1 when autorun action detected in code on peripheral device, 0 otherwise | 0.3 |
| 3 | 1 when request to access system paths or registry detected in code on peripheral device, 0 otherwise | 0.3 |
| 4 | 1 when request for Internet access detected in code on peripheral device, 0 otherwise | 0.2 |
| 5 | 1 when risky file type (e.g. executable file) detected on peripheral device, 0 otherwise | 0.2 |
| 6 | 1 when timing of request outside of predetermined permitted window, 0 otherwise | 0.1 |
| 7 | 1 when peripheral device unique identifier (ID) matches one known to have been previously infected, 0 otherwise | 0.1 |

Indication of the value $f_n$ of any given threat factor in the request $R_i$ profile provided by the user device 110 to the enforcement engine 121 could be direct. That is, the user device 110 could store all the data required to determine the threat factor value $f_n$ itself, or it could query one or more external data sources to obtain some or all of such data or to obtain a determination of the threat factor value. For example:
- determining $f_1$ could involve making use of a virus scanner application installed on the user device 110 which queries a central malware database (e.g. stored on the server 120) with a signature of software stored on the peripheral device 140 to determine whether it matches any known malware signatures stored in the malware database;
- an application installed on the user device 110 could determine the values of $f_2$ to $f_5$ directly;
- the permitted window required to determine $f_6$ could be obtained by the user device 110 querying the policy store 123; and
- the user device 110 could send the ID of the peripheral device 140 to the profile store 122 to query whether it matches one known to have been previously infected.

Alternatively, indication of the value $f_n$ of any given threat factor in the request $R_i$ profile provided by the user device 110 to the enforcement engine 121 could be indirect. That is, the relevant profile field could comprise data required to determine the value $f_n$, as opposed to the value $f_n$ itself. For example:
- a field relating to $f_1$ could comprise a signature of software stored on the peripheral device 140;
- a field relating to $f_2$ to $f_4$ could comprise a copy of code found on the peripheral device 140;
- a field relating to $f_5$ could comprise a list of file types found on the peripheral device 140;
- a field relating to $f_6$ could comprise a time/date stamp; and
- a field relating to $f_7$ could comprise an ID of the peripheral device 140.

Once the threat score $S_i$ has been determined, at query 216 the enforcement engine 121 checks whether it is above a predetermined threshold value $S_t$. If not, then the flow proceeds to step 218 where the enforcement engine 121 queries the current peripheral device policy with the policy store 123. The policy store 123 receives the policy check query at step 222 and responds to the enforcement engine 121 with the current policy at step 224. The enforcement engine 121 receives the current policy at step 232 and makes a decision $D_i$ as to whether to allow the request $R_i$ or not at step 234.

At query 236 the enforcement engine 121 determines whether $D_i$ is positive. If not, then the flow proceeds to step 238 where denial of the request $R_i$ is transmitted to the user device 110. This denial is received by the user device 110, and indicated to the user via a user interface of the user device 110, at step 242. Steps 238 and 242 can alternatively flow from a positive output of query 216. That is, if the threat score $S_i$ is determined to be above the threshold threat score $S_t$ then this implies a negative decision $D_i$, triggering denial of the request $R_i$.

If the outcome of query 236 is positive then the enforcement engine 121 transmits approval of the request $R_i$ to the user device 110 at step 239. The approval is received, and optionally communicated to the user through a user interface of the user device 110, at step 252. The request $R_i$ is allowed by the user device 110 at step 254.

Transmittal of the request denial at step 238 or approval at step 239 leads to step 262 of FIG. 2B, where the enforcement engine 121 transmits the profile of the request $R_i$ to the profile store 122, together with the corresponding decision $D_i$. These are received and stored by the profile store 122 at step 272 and the policy update engine 124 is informed of this database update at step 274. At step 282 the policy update engine 124 receives the database update and updates the weighting factors $w_1 \ldots_F$ accordingly, for example by running a machine learning algorithm.

At query 284 the policy update engine 124 determines whether a particular threat factor's associated weighting coefficient $w_n$ has changed by more than a predetermined amount W in a predetermined period T. If not, the process ends. If so, then an update to the policy $P_n$ in respect of the particular threat factor is transmitted to the policy store 123 at step 286. The policy update is then received and stored by the policy store 123 at step 292. Query 284 and, where present, steps 286 and 292 can be run in respect of one, some or all of the threat factors $f_1$ to $f_F$.

The process 200 of FIGS. 2A and 2B can be started each time a peripheral connection request is received by any of the user devices 110 of the system 100, with i being incremented for each flow. Depending on the timing of the requests, these flows may be performed in series, with any amount of time in between, or partially in parallel.

Network policies could for example include rules relating to one or more of the threat factors $f_1$ to $f_7$ listed above. Alternatively or additionally network policy rules could for example restrict one or more of:

the use of software to a pre-approved list;
the use of macros;
access to certain websites;
access to certain folders; and
use of an administrator account.

Figure 3:
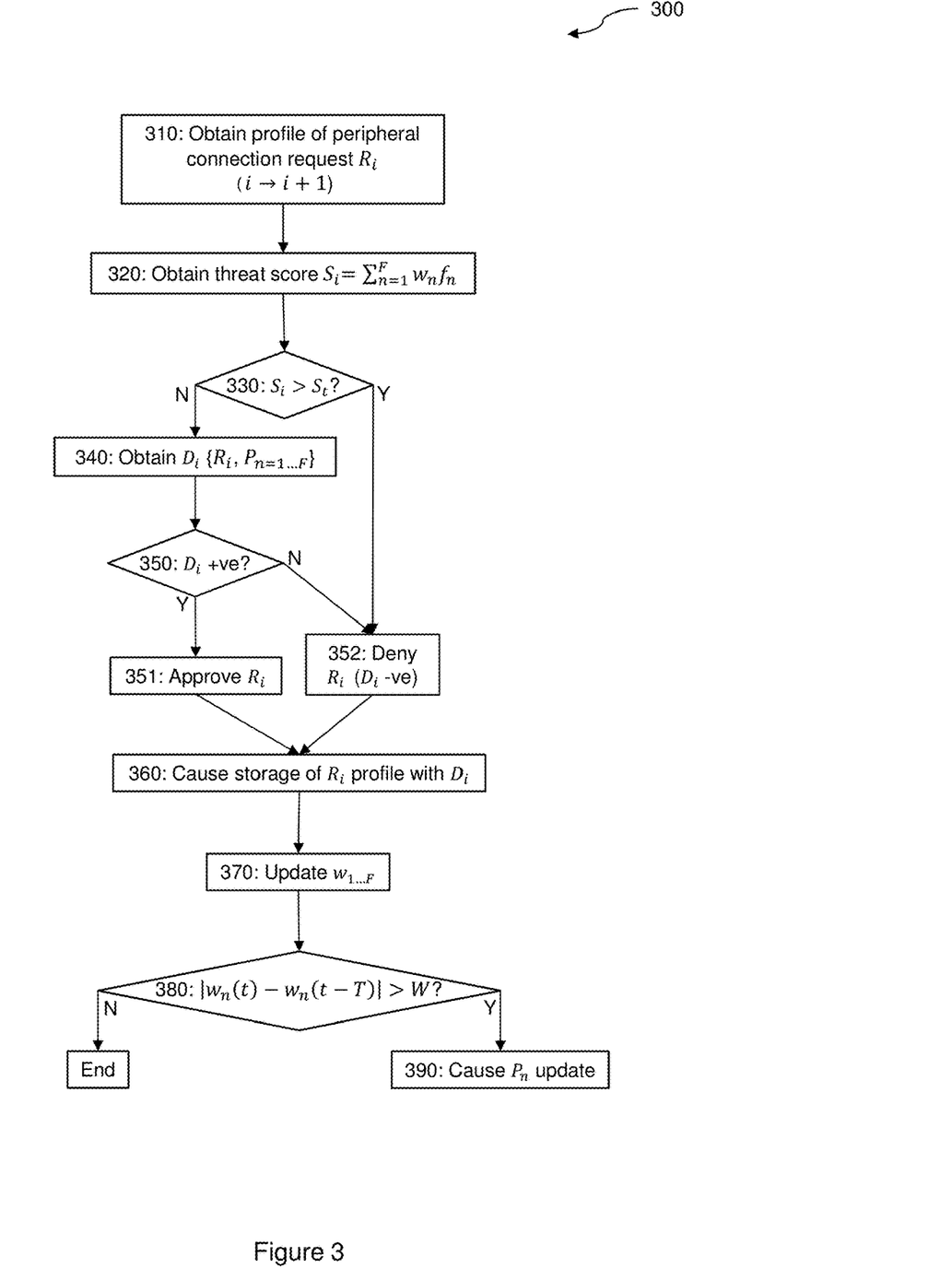
FIG. 3 is a flowchart of an example computer-implemented security method.

FIG. 3 is a flowchart of a computer-implemented security method 300, such as may be performed by the server 120 of FIG. 1.

At step 310 a peripheral connection request profile is obtained detailing a request $R_i$ for a peripheral device (such as one of the peripheral devices 140 of FIG. 1) to connect to a networked device (such as one of the user devices 110 of FIG. 1) comprised in a secure network (such as the network 130 of FIG. 1) which comprises a plurality of such networked devices. The peripheral connection request profile can be received by the computing device implementing the method 300 pre-built, for example from the networked device the request is for connection to. Alternatively, the peripheral connection request profile can be built by the computing device implementing the method 300 based on external information it has received (e.g. from the networked device) and/or information it stores locally (e.g. a current day of the week) and/or information it requests from external sources (e.g. records of previous known infections of a particular peripheral device).

Responsive thereto, at step 320 a threat score $S_i$ associated with the request $R_i$ is obtained, the threat score $S_i$ being determined from a weighted combination of a plurality F of threat factors. Each threat factor has a value $f_n$ dependent on contents of a respective field of the profile and has a respective associated weighting coefficient $w_n$. The threat score $S_i$ could for example be defined as $S_i = \sum_{n=1}^{F} w_n f_n$ as shown in FIG. 3, or as some other weighted combination of the threat factor values.

At query 330 it is determined whether the threat score $S_i$ is above a predetermined threshold $S_t$. If not, a policy decision $D_i$ is obtained based on a comparison of the profile with a policy $P_{n=1 \ldots F}$ associated with the secure network (such as may be stored in the policy store 123 of FIG. 1). Query 350 determines whether the policy decision $D_i$ is positive. If so, then an approval of the request is provided in accordance with the policy decision at step 351. If not, or if the threat score $S_i$ is determined to be above the predetermined threshold $S_t$ at query 330 (which implies a negative policy decision $D_i$), then a denial of the request $R_i$ is provided at step 352.

Following approval or denial of the request at step 360 its peripheral connection request profile is caused to be stored in a database (such as the profile store 122 of FIG. 1) in association with an indication $D_i$ of whether an approval or denial of the request was provided. The weighting coefficients $w_1 \ldots _F$ are then updated at step 370 in dependence on contents of the database.

Updates to the weighting coefficients $w_1 \ldots _F$ are monitored at query 380, which determines whether a particular threat factor's associated weighting coefficient $w_n$ has changed by more than a predetermined amount W in a predetermined period T. If not, the process ends. If so, then the policy $P_n$ in respect of the particular threat factor is caused to be automatically updated at step 390.

The method 300 can be started each time a peripheral connection request is obtained, with i being incremented for each flow. Depending on the timing of the requests, these flows may be performed in series, with any amount of time in between, or partially in parallel. Step 370—and thus query 380 and (when present) step 390—depend on the contents of the database of peripheral device connection request decisions at the time step 370 is performed. Similarly, step 340 depends on the policy at the time it is performed.

If the method 300 is performed by the server 120 of FIG. 1 then step 310 to step 360 could for example be performed by the enforcement engine 121 and step 370 to step 390 by the policy update engine 124. The method 300 could alternatively be performed by another computing device, for example it could be performed locally by the networked device (such as one of the user devices 110 of FIG. 1) at which the request $R_i$ is made, if the networked device is provided with suitable functionality such as an application suitable for performing similar functions to those of the enforcement engine 121 and the policy update engine 124. The method 300 could alternatively be performed by multiple devices. For example an enforcement engine comprised in the networked device could perform step 310 to step 360 and a policy update engine comprised in a central server could perform step 370 to step 390.

The database of peripheral device connection request decisions could reside in the computing device which performs step 360, the computing device which performs step 370 (which can be the same as the computing device which performs step 360), or in another computing device communicably coupled to both of those computing devices.

The policy could be stored in the computing device which performs step 340, the computing device which performs step 390 (which can be the same as the computing device which performs step 340), or in another computing device communicably coupled to both of those computing devices.

Figure 4:
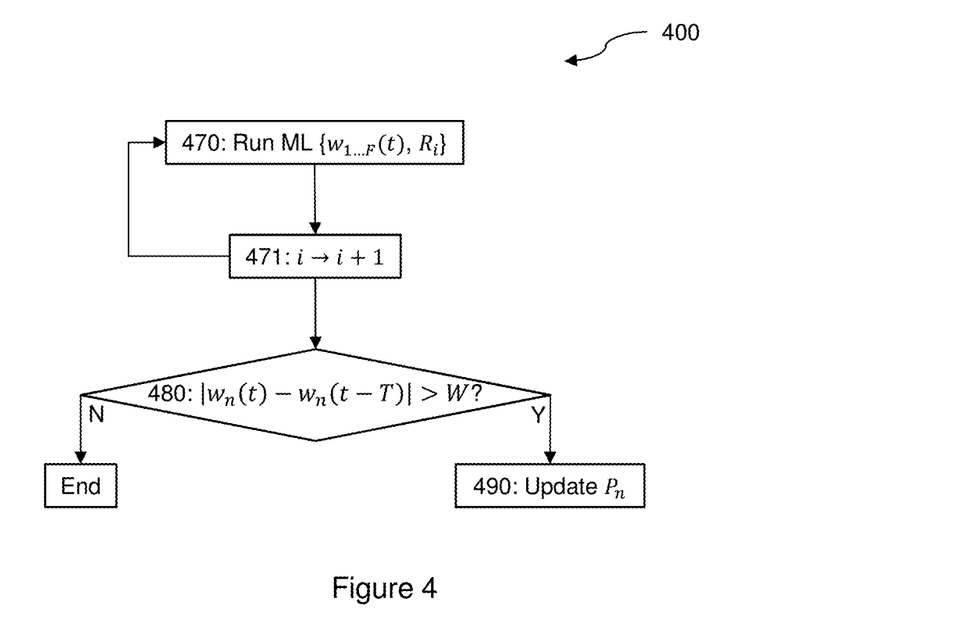
FIG. 4 is a flowchart of an example computer-implemented method of automatically updating a network security policy.

FIG. 4 is a flowchart of a computer-implemented method 400 of automatically updating a network security policy, such as may be performed by the policy update engine 124 of the server 120 of FIG. 1. The method 400 could alternatively be performed by another computing device, for example it could be performed locally by a networked device (such as one of the user devices 110 of FIG. 1) in response to a request for a peripheral device to be connected to that networked device being made.

At step 470 a machine learning algorithm ML is run to update a plurality of weighting coefficients $w_n$ associated with a respective plurality F of threat factors, the threat factors each having values $f_n$ defined for each of a plurality of requests $R_i$ for respective peripheral devices (such as the peripheral devices 140 of FIG. 1) to connect to one or more networked devices (such as the user devices 110 of FIG. 1) communicably coupled to a secure network (such as the network 130 of FIG. 1). At step 471 a new peripheral connection request causes i to be incremented. The flow then returns to step 470 so that the weighting coefficients are updated in a continuous loop over time t.

In addition, query 480 is run on a loop to determine whether a particular threat factor's associated weighting coefficient $w_n$ has changed by more than a predetermined amount W in a predetermined period T. If so, then a security policy $P_n$ associated with the secure network in respect of the particular threat factor is automatically updated at step 490, wherein requests for peripheral devices to connect to networked devices of the secure network are automatically approved or denied in dependence on the policy.

As shown in FIGS. 2B, 3 and 4, a query 284, 380, 480 to determine whether a particular threat factor's associated weighting coefficient $w_n$ has changed by more than a predetermined amount W in a predetermined period T can occur in response to each new peripheral connection request (i.e. it is triggered by i being incremented). Alternatively, as shown in FIG. 5, such a query 520 could be run on a continuous periodic loop without any trigger from peripheral connection requests.

Figure 5:
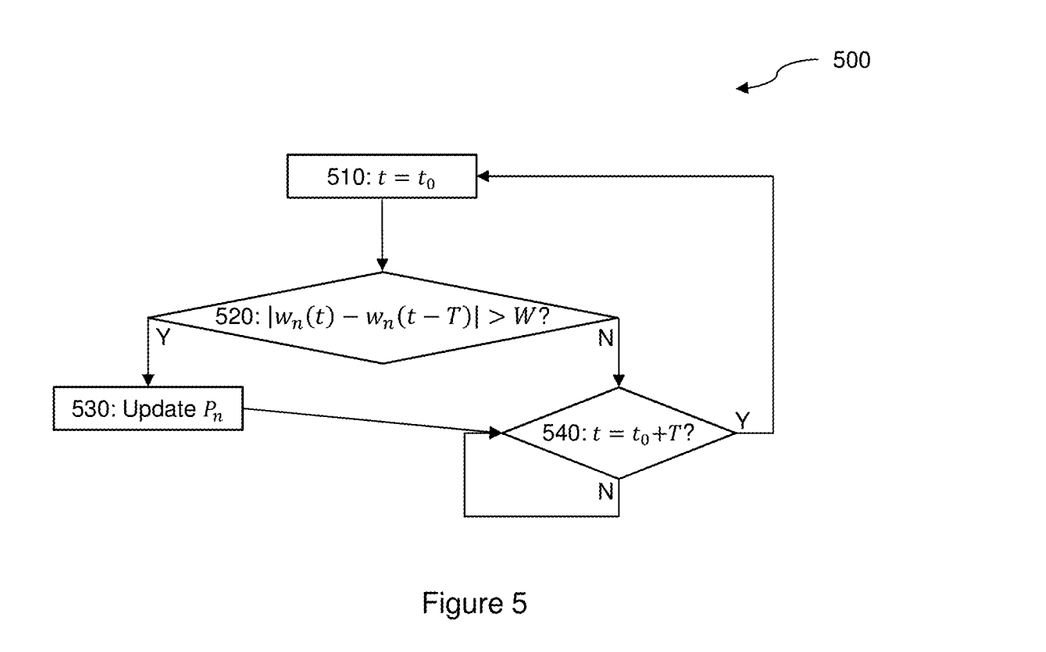
FIG. 5 is a flowchart of an alternative example computer-implemented method of automatically updating a network security policy.

In the process 500 of FIG. 5 a timer is initialised to $t_0$ at step 510. The query 520 is then run to determine whether a particular threat factor's associated weighting coefficient $w_n$ has changed by more than a predetermined amount W in a predetermined period T. If so, then the security policy $P_n$ associated with the secure network in respect of the particular threat factor is automatically updated at step 530. The flow proceeds from both the negative output of query 520 and from step 530 to query 540, where it is determined whether the predetermined period T has passed since initialisation of the timer at step 510. Query 540 is run on a loop until the timer expires, at which point the timer is reinitialised at step 510.

The method 500 can for example be performed by the policy update engine 124 of the server 120 of FIG. 1, or by another computing device.

The query 284, 380, 480, 520 of the methods 200, 300, 400, 500 to determine whether a particular threat factor's associated weighting coefficient $w_n$ has changed by more than a predetermined amount W in a predetermined period T can be run in respect of only a single threat factor, or in respect of two or more of the plurality of threat factors.

In the methods 200, 300, 400, 500 described above, each threat factor can for example be respectively associated with one or more of:
  hardware characteristics of the peripheral device the respective request is for connection of, for example one or more of:
    manufacturer,
    model,
    type (e.g. thumb drive/keyboard/printer),
    storage size, and
    serial/unique ID (e.g. stored together with records of previous infections including details such as:
      date of infection,
      date of detection/removal of malware,
      malware signature,
      malware associated Common Vulnerabilities and Exposures, 'CVEs');
  software characteristics of that peripheral device, for example one or more of:
    presence of known malware, and
    presence of automated behaviours such as one or more of:
      Windows autorun files,
      PowerShell or Bash scripts,
      system path or registry request actions, and
      Internet access request actions;
  storage characteristics of that peripheral device, for example one or more of:
    file types present (e.g. Portable Document Format, '.pdf' and/or executable, '.exe'),
    file system type (e.g. File Allocation Table, 'FAT' or New Technology File System, 'NTFS'),
    free space, and
    number of files and/or folders;
  characteristics of the networked device the respective request is for connection to, for example one or more of:
    device owner/user,
    device type (e.g. laptop/desktop), and
    device operating system; and
  characteristics of the request, for example one or more of:
    date/day of the week/time of the connection, and
    consequences of the connection (e.g. actions initiated automatically or in response to user agreement to automatic prompts).

In the methods 200, 300, 400, 500 described above, updating the policy can for example comprise one or more of:
  adding one or more new rules to the policy;
  adjusting one or more existing rules comprised in the policy; and
  deleting one or more existing rules from the policy.

In the methods 200, 300, 400, 500 described above, the policy can for example comprise one or more rules relating to one or more of:
  categories of peripheral devices permitted to be connected to networked devices of the secure network;
  software permitted to be installed on networked devices of the secure network;
  applications permitted to be run on networked devices of the secure network;
  services permitted to be accessed via the secure network;
  websites permitted to be accessed via the secure network;
  folders and/or files permitted to be accessed via the secure network;
  file types permitted to be opened on networked devices of the secure network;
  time periods when peripheral devices can be connected to networked devices of the secure network; and
  administrator and/or user account logins under which one or more of the above are permitted to be performed.

Figure 6:
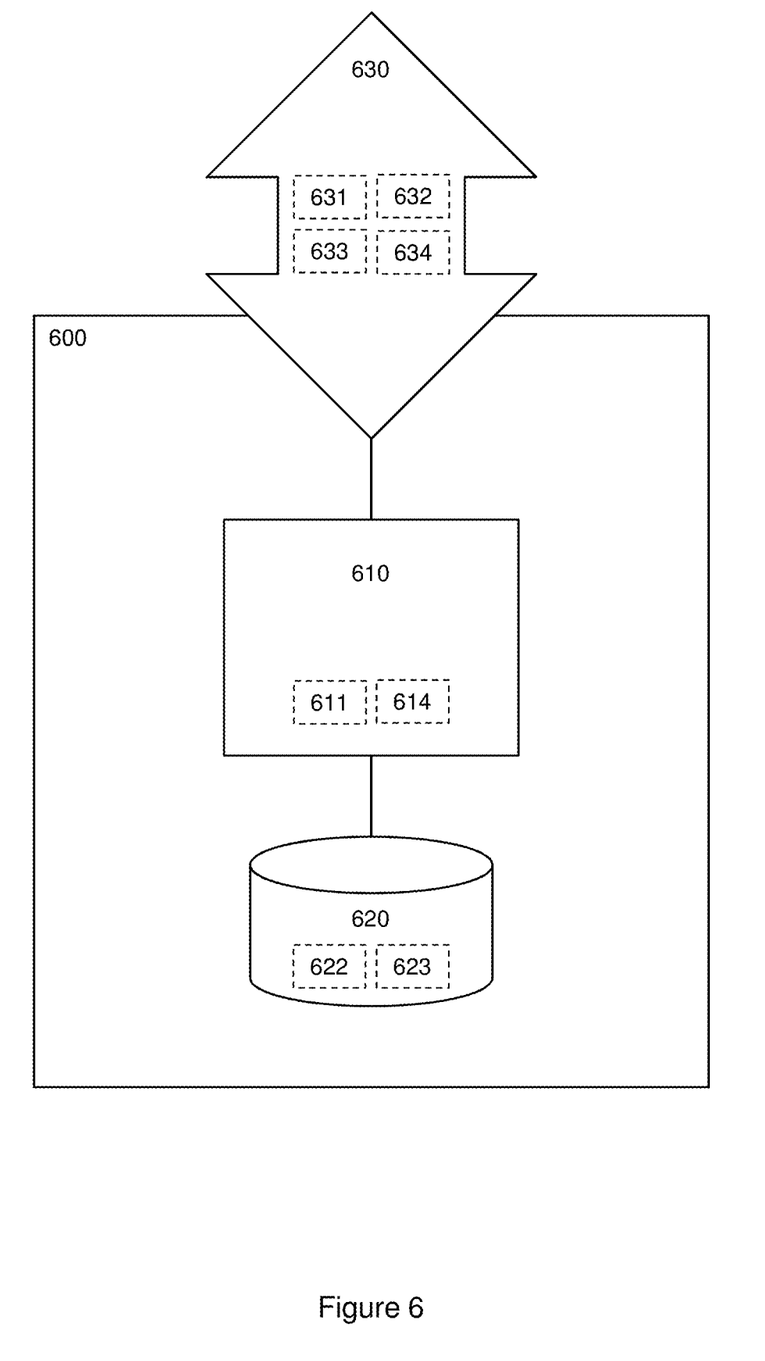
FIG. 6 schematically illustrates an example data processing system capable of performing the methods of FIGS. 3 to 5.

FIG. 6 schematically illustrates a data processing system 600 capable of performing the methods 300, 400, 500 of FIGS. 3 to 5. It comprises a processor 610 operably coupled to both a memory 620 and an interface 630.

The memory 620 can optionally store a computer program comprising instructions which, when the program is executed by the processor 610, cause the data processing system 600 to carry out the method 300 of FIG. 3 or the method 400 of FIG. 4. Alternatively or additionally, the interface 630 can optionally comprise one or both of a physical interface 631 configured to receive a data carrier having such instructions stored thereon and a receiver 632 configured to receive a data carrier signal carrying such instructions.

The interface 630 can optionally comprise a receiver 632 configured to receive one or more of:
  the peripheral connection request profile or information required to build it;
  the threat score or information required to determine it; and
  the policy.

The interface 630 can optionally comprise a transmitter 633 configured to transmit one or more of:
  approval or denial of the peripheral connection request;
  the peripheral connection request profile;
  the policy decision; and
  the updated policy.

The interface 630 can optionally comprise a user interface 634 configured to communicate the policy decision to the user.

The receiver 632 (when present) can comprise one or more wireless receiver modules and/or one or more wired receiver modules. Similarly, the transmitter 633 (when present) can comprise one or more wireless transmitter modules and/or one or more wired transmitter modules.

The processor 610 can optionally perform the functions of one or both of an enforcement engine 611 similar to the enforcement engine 121 of FIG. 1 and a policy update engine 614 similar to the policy update engine 124 of FIG. 1.

The memory 620 can optionally comprise one or both of a profile store 622 similar to the profile store 122 of FIG. 1 and a policy store 623 similar to the policy store 123 of FIG. 1.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

User input devices can include, without limitation, microphones, buttons, keypads, touchscreens, touchpads, trackballs, joysticks, mice, gesture control devices and brain control (e.g. electroencephalography, EEG) devices. User output devices can include, without limitation, speakers, buzzers, display screens, projectors, indicator lights, haptic feedback devices and refreshable braille displays. User interface devices can comprise one or more user input devices, one or more user output devices, or both.

The invention claimed is:

1. A computer-implemented method of automatically updating a network security policy, the method comprising:
running a machine learning algorithm to continuously update a plurality of weighting coefficients associated with a respective plurality of threat factors, the threat factors each having values defined for each of a plurality of requests for respective peripheral devices to connect to one or more networked devices which are communicably coupled to a secure network; and
automatically updating a security policy associated with the secure network in respect of a particular threat factor when that threat factor's associated weighting coefficient changes by more than a predetermined amount in a predetermined period, wherein requests for peripheral devices to connect to the networked devices are automatically approved or denied in dependence on that policy.

2. The method of claim 1, wherein the policy comprises one or more rules relating to one or more of:
categories of peripheral devices permitted to be connected to networked devices of the secure network;
software permitted to be installed on networked devices of the secure network;
applications permitted to be run on networked devices of the secure network;
services permitted to be accessed via the secure network;
websites permitted to be accessed via the secure network;
folders and/or files permitted to be accessed via the secure network;
file types permitted to be opened on networked devices of the secure network;
time periods when peripheral devices can be connected to networked devices of the secure network; and
administrator and/or user account logins under which one or more of the above are permitted to be performed.

3. A computer-implemented security method comprising:
A-i) obtaining a peripheral connection request profile detailing a request for a peripheral device to connect to a networked device which is one of a plurality of networked devices communicably coupled to a secure network;
A-ii) in response to obtaining the peripheral connection request profile, obtaining a threat score associated with the request, the threat score being determined from a weighted combination of a plurality of threat factors, each threat factor:
  having a value dependent on contents of a respective field of the profile, and
  having a respective associated weighting coefficient;
A-iii) in response to obtaining the threat score:
  a) when the threat score is above a predetermined threshold, providing a denial of the request;
  b) otherwise:
    b-i) obtaining a policy decision based on a comparison of the profile with a policy associated with the secure network, then
    b-ii) providing an approval or denial of the request in accordance with the policy decision;
A-iv) in response to providing an approval or denial of the request, causing the profile to be stored in a database in association with an indication of whether an approval or denial of the request was provided; and
A-v) in response to causing the profile to be stored in the database, updating the weighting coefficients in dependence on contents of the database;
the method further comprising:
B-i) monitoring updates to the weighting coefficients; and
B-ii) causing the policy to be automatically updated in respect of a particular threat factor in response to that threat factor's associated weighting coefficient changing by more than a predetermined amount in a predetermined period.

4. The method of claim 1, wherein each threat factor is respectively associated with one or more of:
  hardware characteristics of the peripheral device the respective request is for connection of;
  software characteristics of that peripheral device;
  storage characteristics of that peripheral device;
  characteristics of the networked device the respective request is for connection to; and
  characteristics of the request.

5. The method of claim 1, wherein updating the policy comprises one or more of:
  adding one or more new rules to the policy;
  adjusting one or more existing rules comprised in the policy; and
  deleting one or more existing rules from the policy.

6. A data processing system for automatically updating a network security policy, the data processing system comprising:
  a processor operably coupled with a memory storing instructions which, when executed by the processor, cause the data processing system to be configured at least to:
  run a machine learning algorithm to continuously update a plurality of weighting coefficients associated with a respective plurality of threat factors, the threat factors each having values defined for each of a plurality of requests for respective peripheral devices to connect to one or more networked devices which are communicably coupled to a secure network; and
  automatically update a security policy associated with the secure network in respect of a particular threat factor when that threat factor's associated weighting coefficient changes by more than a predetermined amount in a predetermined period, wherein requests for peripheral devices to connect to the networked devices are automatically approved or denied in dependence on that policy.

7. The data processing system of claim 6, wherein each threat factor is respectively associated with:
  hardware characteristics of the peripheral device the respective request is for connection of;
  software characteristics of that peripheral device;
  storage characteristics of that peripheral device;
  characteristics of the networked device the respective request is for connection to; and/or
  characteristics of the request.

8. The data processing system of claim 6, wherein, in order to update the policy, the data processing system is further configured to:
  add one or more new rules to the policy;
  adjust one or more existing rules comprised in the policy; and/or
  delete one or more existing rules from the policy.

9. The data processing system of claim 6, wherein the policy comprises a rule(s) relating to:
  categories of peripheral devices permitted to be connected to networked devices of the secure network;
  software permitted to be installed on networked devices of the secure network;
  applications permitted to be run on networked devices of the secure network;
  services permitted to be accessed via the secure network;
  websites permitted to be accessed via the secure network;
  folders and/or files permitted to be accessed via the secure network;
  file types permitted to be opened on networked devices of the secure network;
  time periods when peripheral devices can be connected to networked devices of the secure network; and/or
  administrator and/or user account logins under which one or more of the above are permitted to be performed.

10. A non-transitory, computer-readable storage medium storing a computer program comprising instructions which, when the program is executed by a computer, cause the computer to carry out steps for automatically updating a network security policy, the steps comprising:
  running a machine learning algorithm to continuously update a plurality of weighting coefficients associated with a respective plurality of threat factors, the threat factors each having values defined for each of a plurality of requests for respective peripheral devices to connect to one or more networked devices which are communicably coupled to a secure network; and
  automatically updating a security policy associated with the secure network in respect of a particular thread factor when that threat factor's associated weighting coefficient changes by more than a predetermined amount in a predetermined period, wherein requests for peripheral devices to connect to the networked devices are automatically approved or denied ion dependence on that policy.

* * * * *